United States Patent
Wagner et al.

(10) Patent No.: US 11,775,291 B2
(45) Date of Patent: Oct. 3, 2023

(54) AUTOMATED UPDATES TO CODE DEPLOYMENT PIPELINES

(71) Applicant: Disney Enterprises, Inc., Burbank, CA (US)

(72) Inventors: Steven Wagner, Los Angeles, CA (US); Jason Alexander Cox, Valencia, CA (US); Adam Arredondo, Mission Viejo, CA (US); James H. Tatum, Anaheim, CA (US); Patrick O'Connor, Fontana, CA (US); Ian C. Ward, Winter Garden, FL (US); Maya K. Senen, Seattle, WA (US); Brian Lawrence Scott, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/672,063

(22) Filed: Feb. 15, 2022

(65) Prior Publication Data
US 2023/0259356 A1 Aug. 17, 2023

(51) Int. Cl.
*G06F 8/71* (2018.01)
*G06F 8/65* (2018.01)
*G06F 8/61* (2018.01)

(52) U.S. Cl.
CPC .............. *G06F 8/71* (2013.01); *G06F 8/61* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 6,968,541 B1* | 11/2005 | Hanson | G06F 8/41 717/136 |
| 9,760,366 B2* | 9/2017 | Frank | G06F 16/958 |
| 10,318,285 B1* | 6/2019 | Jodoin | G06F 11/3612 |
| 10,768,929 B1* | 9/2020 | Turner | G06F 8/38 |
| 10,963,243 B2* | 3/2021 | Alexander | G06F 11/3688 |
| 2012/0324417 A1* | 12/2012 | Somani | G06F 8/30 717/101 |
| 2015/0074633 A1 | 3/2015 | Slack et al. | |

OTHER PUBLICATIONS

Snyk User Docs, "Snyk's core concepts", retrieved Feb. 15, 2022, 8 pgs. <https://doc.snyk.io/introducing-snyk/snyks-core-concepts>.

(Continued)

*Primary Examiner* — Marina Lee
(74) *Attorney, Agent, or Firm* — Artegis Law Group, LLP (57) ABSTRACT

Certain aspects of the present disclosure provide techniques for automated updates to code deployment pipelines. This includes identifying a proposed change to a plurality of source code repositories based on parsing a change template. It further includes determining one or more changes to one or more files in each respective source code repository, of the plurality of source code repositories, based on the proposed change. It further includes changing the one or more files in each respective source code repository, based on the determined one or more changes, and building a project in each respective source code repository using the changed one or more files.

20 Claims, 7 Drawing Sheets

(56) References Cited

OTHER PUBLICATIONS

© GitHub, Inc. "Keep all your packages up to date with Dependabot", The GitHub Blog, retrieved Feb. 15, 2022, 7 pgs. <https://github.blog/2020-06-01-keep-all-your-packages-up-to-date-with-dependabot/>.

© GitLab B.V., Secure, retrieved Feb. 15, 2022, 6 pgs. <https://about.gitlsb.com/stages-devops-lifecycle/secure/>.

© Gemnasium 2012-2015, "Gemnasium auto-update: get GitHub Pull Requests!", retrieved Feb. 15, 2022, 2 pgs. <https://gemnasium.tumblr.com/post/92429331985/gemnasium-auto-update-get-github-pull-requests>.

"Introduction to Batch Changes—Sourcegraph docs", retrieved Feb. 15, 2022, 5 pgs. <https://docs.sourcegraph.com/batch_changes/explanations/introductions_to_batch_changes>.

\* cited by examiner

AUTOMATED UPDATES TO CODE DEPLOYMENT PIPELINES

BACKGROUND

Many source code repositories include instructions, across repositories, that share certain similarities but that are not identical. For example, source code in different repositories can make analogous application programmer interface (API) calls to a particular third party API. These calls may be similar across the various repositories, but not identical. If this API changes, the calls must be modified across all source code repositories to ensure that all the repositories correctly call the API. Typically, this must be done manually, by requiring an engineer responsible for each repository to make the change in the repository, review the change, and commit the change to the repository. Making manual changes is extremely inefficient and time consuming, and prone to human error. Further, the process of implementing manual changes dis-incentivizes potential improvements across repositories because of the burden in making changes.

SUMMARY

Embodiments include a method. The method includes identifying a proposed change to a plurality of source code repositories based on parsing a change template. The method further includes determining one or more changes to one or more files in each respective source code repository, of the plurality of source code repositories, based on the proposed change. The method further includes changing the one or more files in each respective source code repository, based on the determined one or more changes. The method further includes building a project in each respective source code repository using the changed one or more files.

Embodiments further include non-transitory computer-readable medium containing computer program code that, when executed by operation of one or more computer processors, performs operations. The operations include identifying a proposed change to a plurality of source code repositories based on parsing a change template. The operations further include determining one or more changes to one or more files in each respective source code repository, of the plurality of source code repositories, based on the proposed change. The operations further include changing the one or more files in each respective source code repository, based on the determined one or more changes. The operations further include budding a project in each respective source code repository using the changed one or more files.

Embodiments further include a system, including a computer processor, and a memory having instructions stored thereon which, when executed on the computer processor, performs operations. The operations include identifying a proposed change to a plurality of source code repositories based on parsing a change template. The operations further include determining one or more changes to one or more files in each respective source code repository, of the plurality of source code repositories, based on the proposed change. The operations further include changing the one or more files in each respective source code repository, based on the determined one or more changes. The operations further include building a project in each respective source code repository using the changed one or more files.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

As defined in the present application, the terms "automation," "automated," and "automating" refer to systems and processes that do not require the participation of a human user, such as a human system administrator. Although in some implementations a human system administrator may review the performance of the systems and methods disclosed herein, that human involvement is optional. Thus, the processes described in the present application may be performed under the control of hardware processing components of the disclosed systems.

In an embodiment, multiple source code repositories with similar contents can be updated automatically. For example, a change template can be generated to identify changes across repositories. The change template can include a description of changes, along with change actions used to fulfill the changes and a listing of repositories where the changes should be made. In an embodiment, the template can be generated automatically (e.g, based on previously committed changes) or manually (e.g., by a submitter).

As discussed further below, in an embodiment, the change template can be used to generate integrate requests for multiple source code repositories (e.g., merge requests, pull requests, review requests, or any other suitable request to integrate changes into the repository). For example, a suitable software service can use the change template to generate integrate requests (e.g., including the requested changes) for each relevant source code repository. The integrate requests can be deployed to a respective code deployment pipeline for each repository, where they can be reviewed by a reviewer for that repository (e.g., an engineer). The reviewer can analyze the integrate request and choose to commit the change, without having to manually implement the changes across repositories.

Further, the code deployment pipeline can deploy the proposed changes (e.g., in a test environment), and can perform tests on the modified project. The tests can be analyzed automatically, analyzed by a reviewer, or both, to determine whether the changes are successful. For example, the changes can be deemed successful if all tests are passed, if all critical tests are passed, if all tests of a particular type or for a particular model are passed, or based on any other suitable criteria. If the changes are successful, they can be deployed to the relevant source code repository, or repositories. If the changes are not successful, the changes, the test results (e.g., log files or outputs from the tests), both, or any other suitable information, can be used to modify, or improve, the change template to correct any errors.

One or more of the techniques described herein can have numerous technical advantages. For example, one or more of these techniques can be used to improve build and deployment of software projects by improving automated updates across source code repositories. This can reduce processing power needed to make changes, by streamlining changes across repositories, and can reduce engineering time need to create and implement changes across repositories. Further, allowing for automated updates allows for more rapid deployment of changes across repositories. This allows for improved security (e.g., by propagating security fixes more quickly and easily across repositories), improved efficiency of the software projects (e.g., by propagating efficiency improvements across software projects), and more robust software projects (e.g., by automating the update process across projects, to quickly propagate bug fixes across projects and avoid human errors in the updating).

Figure 1:
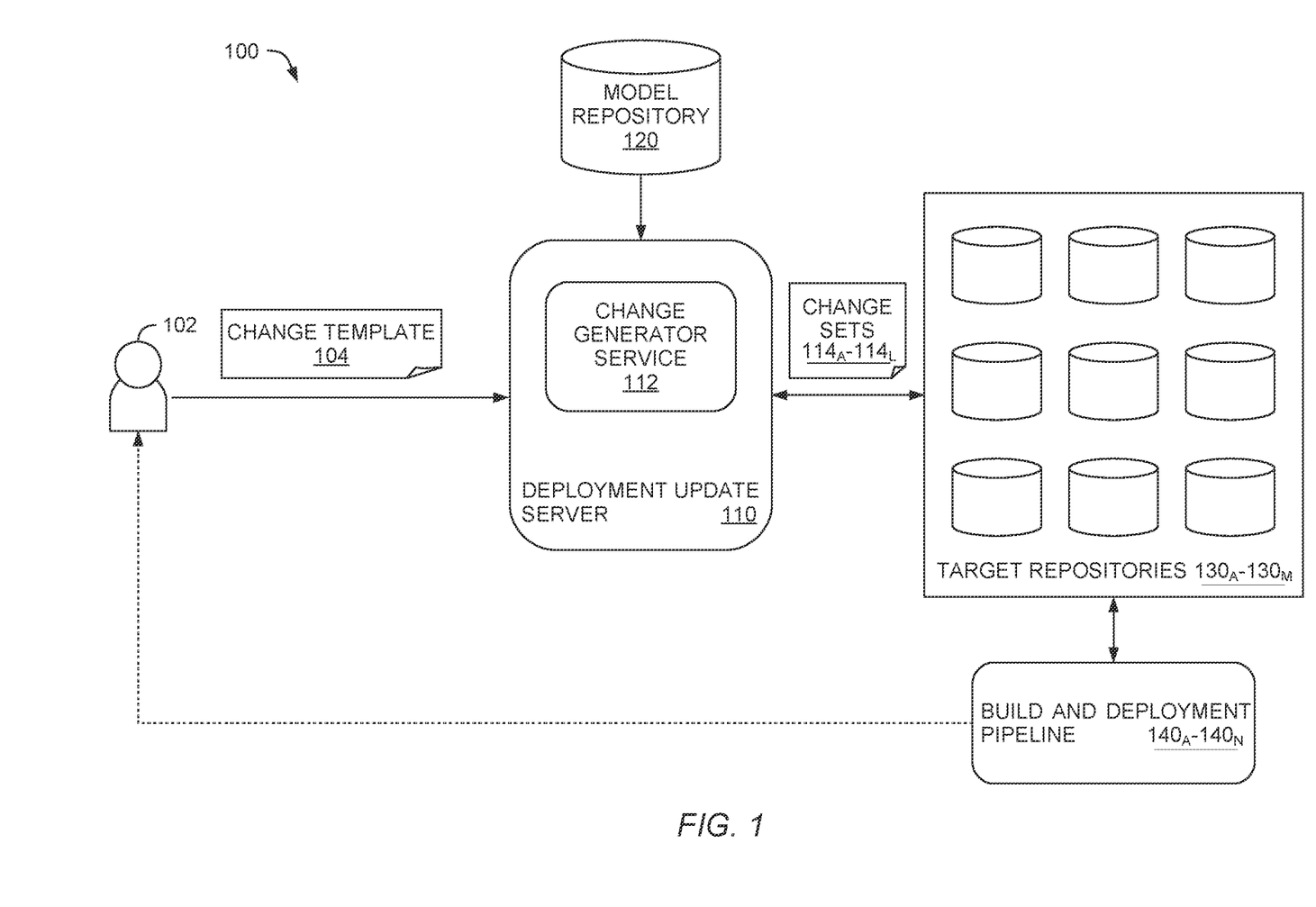
FIG. 1 illustrates a computing environment for automated updates to code deployment pipelines, according to one embodiment.

FIG. 1 illustrates a computing environment 100 for automated updates to code deployment pipelines, according to one embodiment. A submitter 102 (e.g., an engineer) transmits a change template 104 to a deployment update server 110. In an embodiment, the change template 104 describes changes to one or more files in a source code repository. For example, the change template 104 can provide rules describing modifications to files (e.g., rules to transform a portion of the file), replacements of files (e.g., replacing an existing file with a newer version or different file), or any other suitable rules. An example of a change template 104 is described further with regard to FIG. 6B, below.

Further, in an embodiment, the change template 104 can be generated automatically. For example, a suitable software service can query a source code repository for prior successful changes (e.g., prior changes to library versions, prior replacement of configuration files, or any other suitable changes). These prior successful changes can be used to generate a change template 104. This is described further with regard to FIG. 6A, below. Alternatively, or in addition, the change template 104 can be generated manually (e.g., by the submitter 102 or another suitable person). For example, the submitter 102 can create a change template 104 (e.g., using a suitable user interface) describing the desired rules for the changes across source code repositories.

The deployment update server 110 includes a change generator service 112. In an embodiment, the change generator service 112 generates a proposed change set $114_A$-$114_L$ for each of the target repositories $130_A$-$130_M$ (e.g., integrate requests for the target repositories). In an embodiment, any suitable number of change sets $114_A$-$114_L$ and any suitable number of target repositories $130_A$-$130_M$ can be used. For example, as discussed above, an entity can maintain a large number of source code repositories across a variety of software projects and solutions. In an embodiment, the change generator service 112 uses the change template 104 to generate a proposed change set $114_A$-$114_L$ (e.g., a repository integrate request) for each of the target repositories $130_A$-$130_M$. This is discussed further below, with regard to FIGS. 3-5.

Further, in an embodiment, the change generator service 112 can receive model files from a model repository 120 and use these model files to generate the change sets $114_A$-$114_L$. For example, the change template 104 can describe replacing a given file with a newer version of the file (e.g., updating the contents of the file), The change generator service 112 can retrieve the replacement file from the model repository 120. This is also discussed further below, with regard to FIGS. 3-5.

In an embodiment, target repositories $130_A$-$130_M$ store the change sets to be used by the respective build and deployment pipelines $140_A$-$140_N$. For example, the change sets $114_A$-$114_L$ can be integrate requests added to each deployment pipeline $140_A$-$140_N$. As discussed further below with regard to FIG. 5, the deployment pipeline can commit the integrate request in a test environment, test the project with the modified files, and deploy the changes if they are successful (e.g., if a reviewer deems the changes successful).

Further, a suitable reviewer (e.g., an engineer responsible for maintaining the source code repository) can review the change sets $114_A$-$114_L$. For example, the reviewer can review both the source code changes and the results of the test environment build and testing. The reviewer can the decide whether to accept the changes and integrate them into the source control repository, or reject the changes.

In an embodiment, if the reviewer rejects the changes, the rejection and the reasons for the rejection can be used to modify the change template 104. For example, the respective build and deployment pipeline $140_A$-$140_N$ can notify the submitter 102 of the rejection, and can provide a description of any errors. The submitter can use this information to modify or extend the change template 104 (e.g., to avoid future rejections). As another example, errors identified using the build and test in the test environment can be used to automatically modify a change template 104. For example, the change generator service 112 could parse a suitable log file, or files, identify errors (e.g., compile-time errors) and correct the change template to fix the errors.

Figure 2:
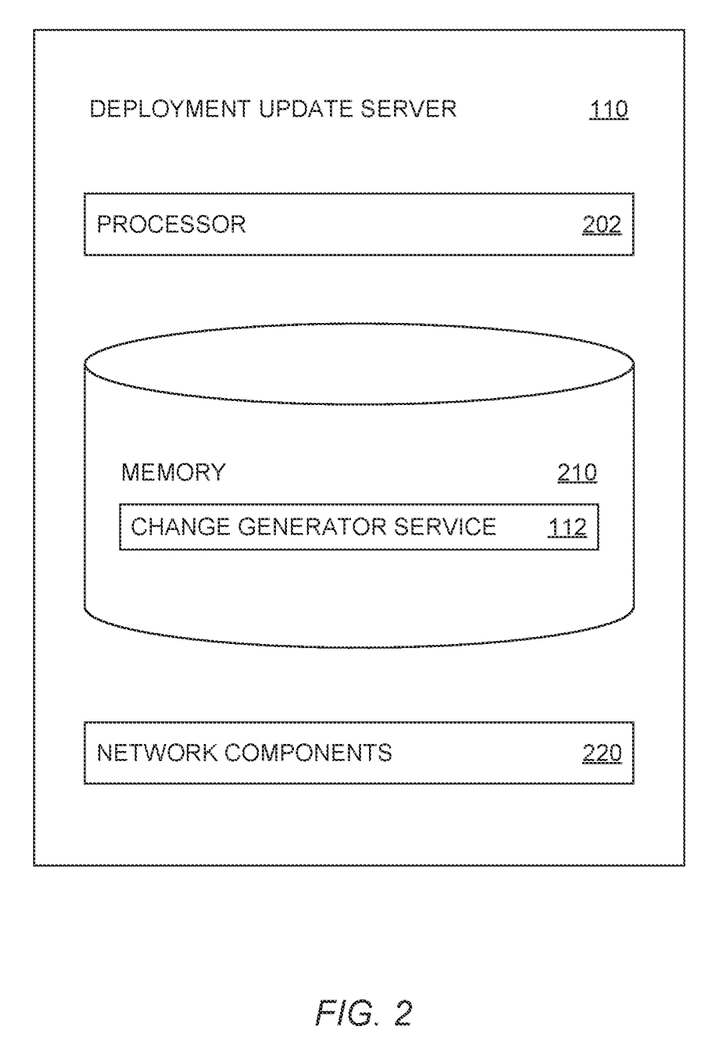
FIG. 2 illustrates a deployment update server for automated updates to code deployment pipelines, according to one embodiment.

FIG. 2 illustrates a deployment update server 110 for automated updates to code deployment pipelines, according to one embodiment. The deployment update server 110 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the deployment update server 110 to interface with a suitable communication network (e.g., a communication network interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the deployment update server 110. The program code is generally described as various functional "applications" or "modules" within the memory 210, although alternate implementations may have different functions and/or combinations of functions. Within the memory 210, the change generator service 112 facilitates generating one or more change sets for target code repositories, using a change template. This is discussed further below with regard to FIGS. 3-5.

While the deployment update server 110 is illustrated as a single entity, in an embodiment, the various components can be implemented using any suitable combination of physical compute systems, cloud compute nodes and storage locations, or any other suitable implementation. For example, the deployment update server 110 could be implemented using a server or cluster of servers. As another example, the deployment update server 110 can be implemented using a combination of compute nodes and storage locations in a suitable cloud environment. For example, one or more of the components of the deployment update server 110 can be implemented using a public cloud, a private cloud, a hybrid cloud, or any other suitable implementation. Further, deployment update server 110 may include one or more computing platforms, such as computer servers for example, which may be co-located, or may form an interactively linked but distributed system, such as a cloud-based system.

Figure 3:
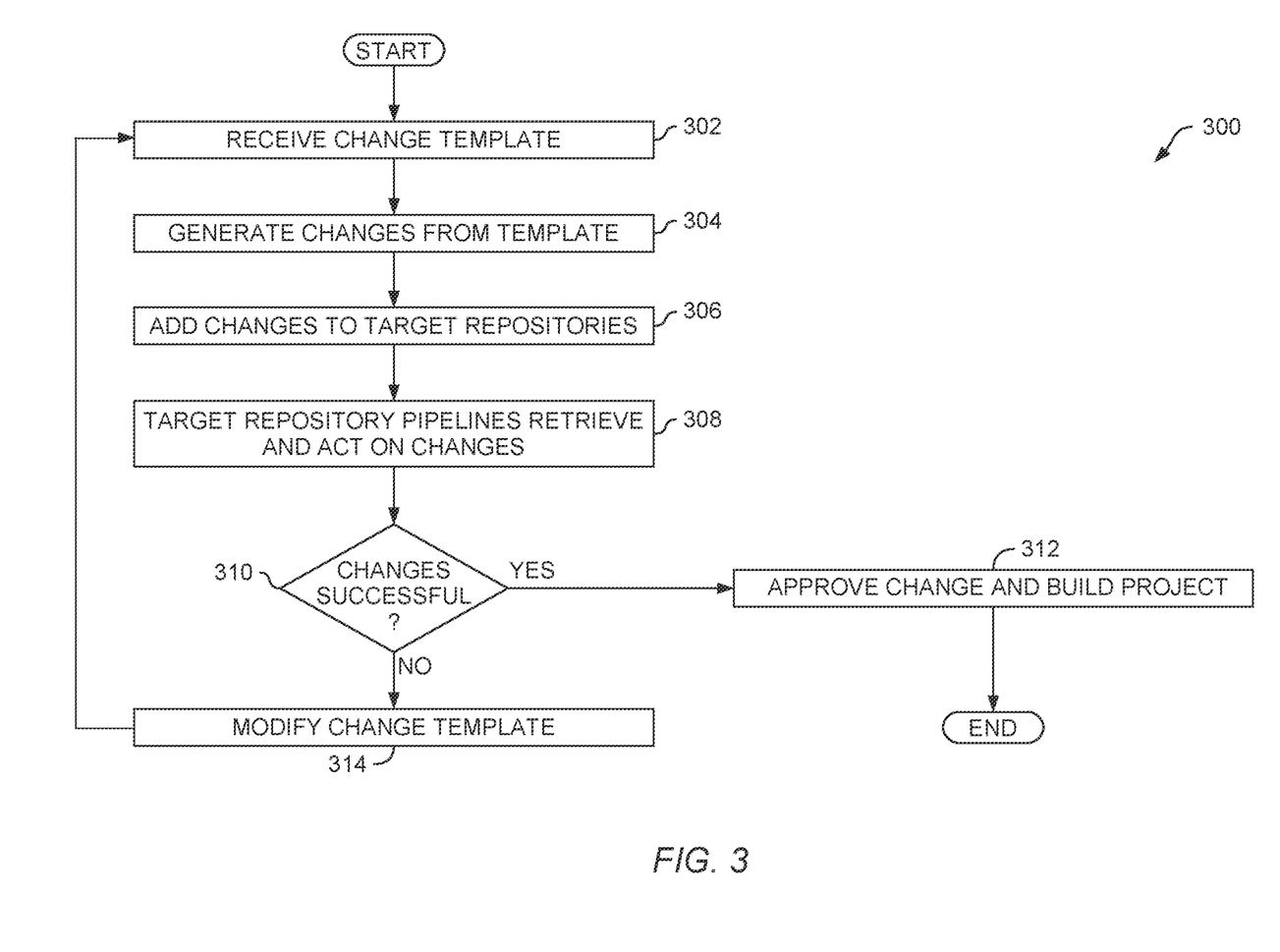
FIG. 3 is a flowchart illustrating automated updates to code deployment pipelines, according to one embodiment.

FIG. 3 is a flowchart 300 illustrating automated updates to code deployment pipelines, according to one embodiment. At block 302 a change generator service (e.g., the change generator service 112 illustrated in FIGS. 1 and 2) receives a change template. For example, the change generator service, or another suitable software service, can automatically generate a change template based on prior successful changes to a source code repository. This is discussed further with regard to FIG. 6A, below. Alternatively, or in addition, a user (e.g., the submitter 102 illustrated in FIG. 1) generates the change template and provides it to the change generator service. For example, the user can be provided with a suitable user interface, and can generate a change template describing the desired changes for a source code repository. An example change template is illustrated in FIG. 6B, below.

At block 304, the change generator service generates changes from the change template. This is discussed further with regard to FIG. 4, below. For example, the change generator service can parse the change template to identify changes to particular files in source code repositories. In an embodiment, the change template identifies both the target source repositories, or target source code projects within repositories, and the proposed changes to each repository or project.

Figure 4:
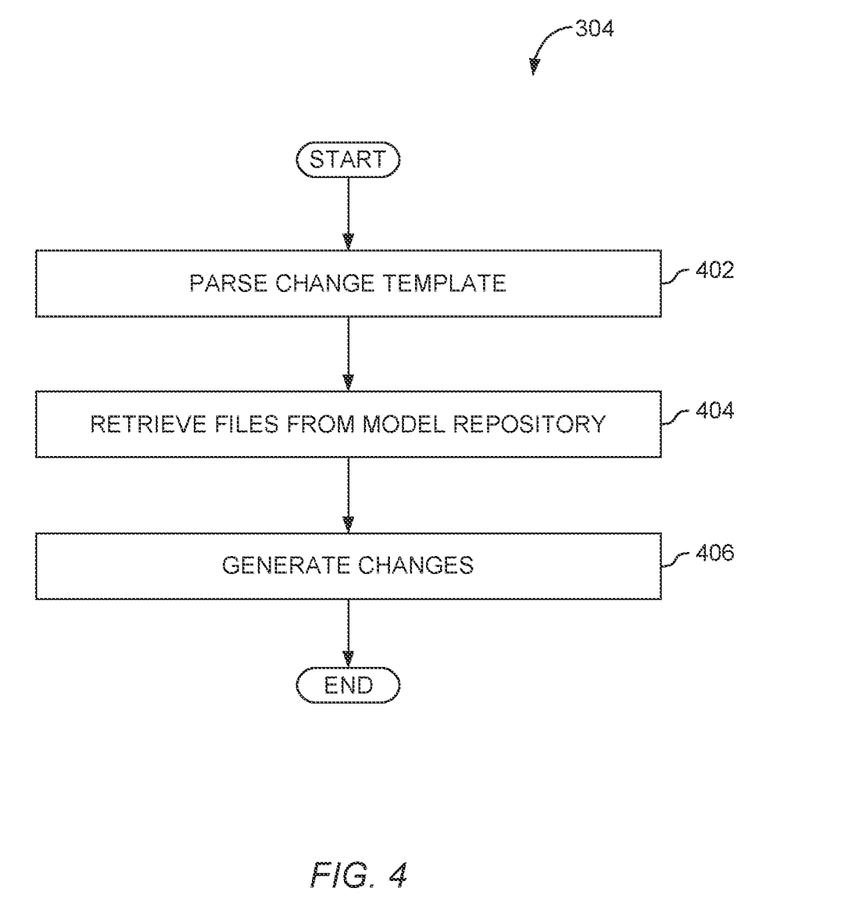
FIG. 4 is a flowchart illustrating generating changes from a change template, according to one embodiment.

The change generator service can generate change sets (e.g., the change sets $114_A$-$114_L$ illustrated in FIG. 1) reflecting the desired changes. For example, the change sets can be suitable integrate requests for target source code repositories. As another example, the change generator service can parse the change template to identify files in the source code repositories that should be replaced. The change generator service can retrieve updated files (e.g., from the model repository 120 illustrated in FIG. 1), and can generate change sets (e.g., integrate request) to replace the files described in the change template with the updated files. This process is illustrated in FIG. 4.

At block 306, the change generator service adds the change sets to the target source code repositories, For example, the change generator service can generate an integrate request for each target code repository, and can add the integrate request to the respective target repository. This can include, for example, creating a branch in the target code repository and adding the integrate request to the branch (e.g., to allow easy rollback if the changes are rejected).

In an embodiment, the change generator service adds the changes to the target repository automatically. Alternatively, or in addition, the change generator service facilitates the submitter adding the changes. For example, as discussed above, the change generator service can provide the generated changes to the submitter for review. The submitter can then choose to submit the changes to some, or all, of the proposed target repositories.

Further, the change generator service can provide a notification to a reviewer for each target source code repository of the changes. For example, the change template can include a textual description of the change. The change generator service can provide a notification to a reviewer for each target repository, including the textual description, to notify the reviewer of the proposed changes.

Additionally, in an embodiment, a submitter, or any other suitable reviewer, can review the proposed changes before they are provided to the target repositories. For example, the change generator service can generate changes for all target repositories, or for a subset of target repositories (e.g., a sample repository). The change generator service can then provide a description of the proposed changes (e.g. using a suitable user interface) to the submitter. The submitter can then decide whether to proceed to add the changes to the target repositories, or to exit the process (e.g., to revise the change template). For example, a submitter may identify an error in the change template, or an unintended consequence of actions described in the change template. The submitter can stop the process after changes are generated, but before they are provided to target repositories.

At block 308, the target repository pipelines retrieve and act on the changes. For example, as discussed above, the change generator service can generate change sets (e.g., integrate requests) for each target repository. Each respective target repository pipeline (e.g., the build pipeline for the repository) can then retrieve and act on the changes. This can include applying the changes to a test environment (e.g., committing the integrate requests in a test environment), building the affected project in the test environment (e.g., using existing build tools), and running tests to determine whether the changes appear to be successful. This is discussed further with regard to FIG. 5, below.

At block 310, the change generator service, or another suitable software service, determines whether the change is successful. For example, each respective target repository pipeline can return an indication of the success, or failure, of testing after applying the changes. The change generator service can use this indication to determine whether the change is successful. If the change is successful, the flow proceeds to block 312.

At block 312, a reviewer or a suitable software service approves the changes and builds the project. In an embodiment, a suitable reviewer (e.g., tasked with maintaining the repository) reviews and approves the changes. For example, the reviewer can review the changes themselves (e.g., the integrate request for the relevant target repository), the results of any tests run with the changes, and any other suitable information. The reviewer can then approve the changes and the changes can be accepted into the target repository, changing the relevant files. In an embodiment, the change template includes a description label that the reviewer can use to discern the purpose of the changes. Further, in an embodiment, after the reviewer approves the changes, the reviewer (using a suitable software application or service) can build the project with the changed files. For example, the reviewer can use a build and release system (e.g., a source control platform or any other suitable build and release system) to apply the changes and build the project.

Alternatively, or in addition, a suitable software service can automatically approve the changes. For example, a build and release system (e.g., a source control system), the change generator service, or any other suitable software service, can identify that the testing for the target repository pipeline is successful for the proposed changes. The software service can then apply the changes and change the relevant files. Further, the software service can consider the changes. For example, the software service can identify the file(s) for which changes are made, and can automatically commit changes only to approved files (e.g., build files or configuration files). This can avoid automatically committing erroneous or incorrect changes to important files. In this embodiment, the software service (e.g., a build and release system) can build the project with the changed files.

Returning to block 310, if the changes are not successful (e.g., one or more designated tests fail) the flow proceeds to block 314. At block 314 the change generator service modifies the change template (e.g., to correct any errors leading to the failed changes). In an embodiment, a reviewer (e.g., for the relevant target repository) reviews the failures (e.g., log files reflecting testing of the changes). The reviewer can then provide comments to the submitter (e.g., the submitter 102 illustrated in FIG. 1) to help the submitter modify the change template to correct any errors. Alternatively, or in addition, the change generator service can provide the failure information (e.g., log files or test results) to the submitter for the submitter to review and use to modify the change template.

Alternatively, or in addition, the change generator service can automatically correct the change template. For example, the change generator service can identify a previously successful change template, and can modify the unsuccessful template to match the successful change template.

As discussed above, in an embodiment one or more illustrated techniques can be used for automated updates to existing deployment pipelines for target source code repositories. This is merely an example. One or more techniques could also be used to migrate between deployment pipelines (e.g., for mirrored systems, or changes to deployment or build software) or to migrate between source code repositories.

FIG. 4 is a flowchart illustrating generating changes from a change template, according to one embodiment. In an embodiment, FIG. 4 corresponds with block 304 illustrated in FIG. 3. At block 402, a change generator service (e.g., the change generator service 112 illustrated in FIGS. 1 and 2) parses a change template (e.g., the change template 104 illustrated in FIG. 1).

In an embodiment, the change template can include pre-defined change actions, which the change generator service can identify when parsing the template. For example, the change template can include actions requesting to add a file, replace a file, remove a file, create a new file (e.g., with a defined set of instructions), change a string in a file, replace statements (e.g., source statements) in module declarations (e.g., for infrastructure as code declarations), run a local command (e.g., to retrieve, modify, and re-submit files), or perform any other suitable action. These are merely examples, and the change template can include any suitable actions. FIG. 6B, below, further illustrates an example change template.

At block 404, the change generator service retrieves files from a model repository (e.g., the model repository 120 illustrated in FIG. 1). In an embodiment, the change template parsed at block 402 includes actions that rely on one or more files in the model repository. For example, the change template can include an action to replace a file, replace a portion of a file, generate a new file based on a model template, or another suitable action. The change generator service can retrieve files from the model repository (e.g., a model file or model template) to complete the action. For example, the change generator service can identify an action to replace a file in a target repository. The change generator service can retrieve the model (e.g., replacement) file from the model repository. In an embodiment, the location of the model repository is included in the change template. This is one example, and the location of the model repository can also be pre-defined, provided by a submitter, or provided in any other suitable manner.

At block 406, the change generator service generates changes. For example, the change generator service can generate integrate requests for target source code repositories from the changes in the change template. In an embodiment, the change generator service can generate an integrate request for each target source code repository. For example, the change template can identify the target source code repositories for the changes. This is merely an example, and the target source code repositories can be identified separately from the change template (e.g., pre-defined, defined separately by a submitter, or defined in any other suitable manner). As discussed above, the change generator service can create a branch in each relevant target source code repository, and add the integrate request to the target source code repository.

Figure 5:
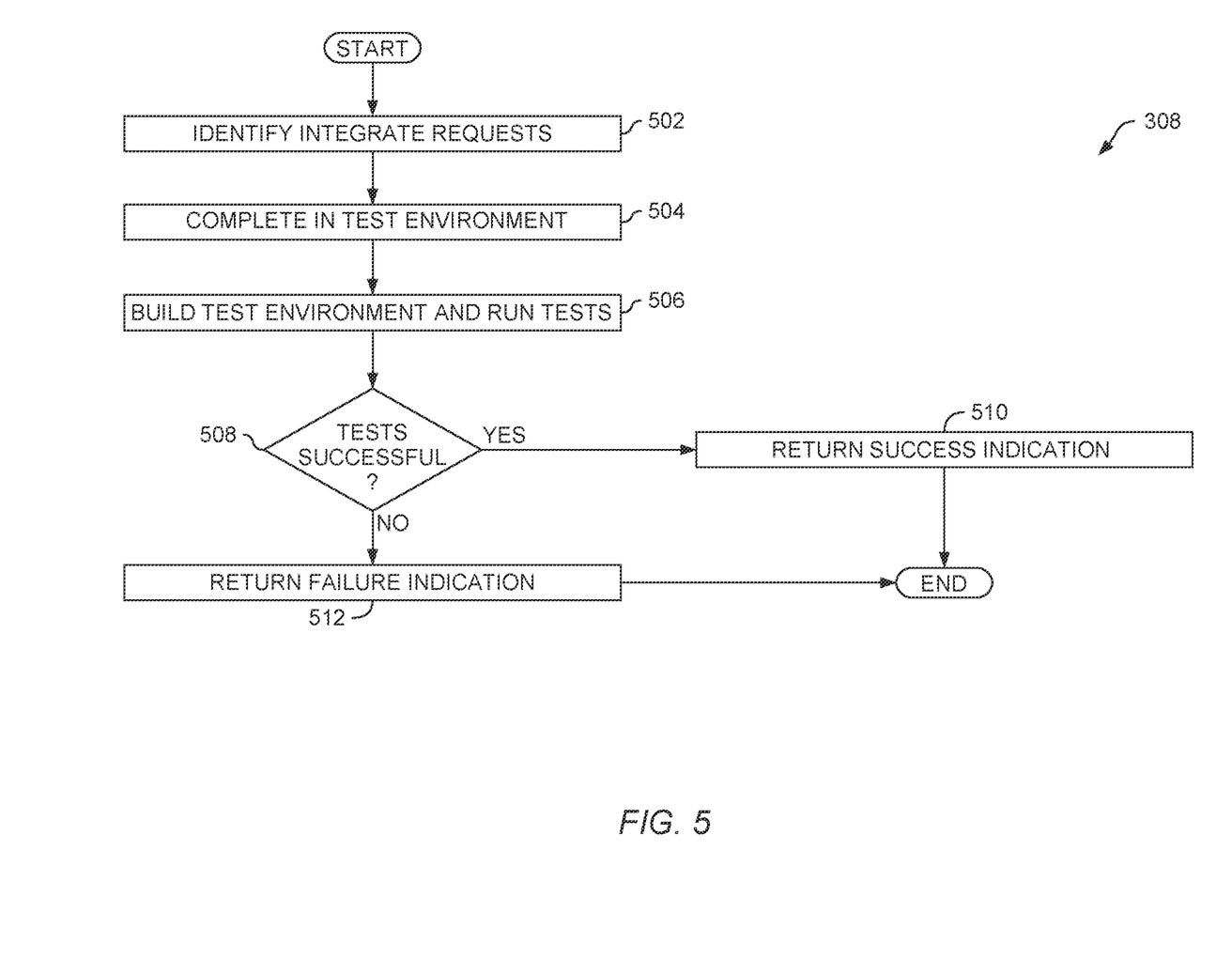
FIG. 5 is a flowchart illustrating a deployment pipeline acting on changes for automated updates to code deployment pipelines, according to one embodiment.

FIG. 5 is a flowchart illustrating a deployment pipeline acting on changes for automated updates to code deployment pipelines, according to one embodiment. In an embodiment, FIG. 5 corresponds with block 308 illustrated in FIG. 3. At block 502, a deployment pipeline (e.g., any suitable software build and deployment system or technique) identifies one or more integrate requests. As discussed above, in an embodiment the integrate requests may be added to a new branch in the target repository. In this embodiment, the deployment pipeline identifies the integrate requests in the branch. This is merely an example, and the integrate requests can be retrieved from an existing portion of the repository (e.g., if they are not added to a new branch).

At block 504, the deployment pipeline completes the integration in a test environment. For example, the deployment pipeline can commit the identified integrate requests in a test environment (e.g., an environment that does not affect production deployment). This can allow for easy rollback of changes, if they are unsuccessful.

As discussed above, in an embodiment, changes are made in source code repository (e.g., a remotely hosted source code repository). This is merely an example. Alternatively, or in addition, relevant files could be present on a submitter's local computer (e.g., retrieved from a remote repository) and changes could be made to the local files.

At block 506 the deployment pipeline builds the test environment and runs tests. For example, the deployment pipeline builds the software projects using files in the test environment (e.g., including the changes from the integrate requests). The deployment pipeline can test that the build is successful, and can further run additional tests assuming the build is successful. For example, the deployment pipeline can run automated tests designed to ensure that the build is operational (e.g., existing tests created to test the build and the operation of the software project).

Further, in an embodiment, the deployment pipeline identifies that the changes are automated updates from the change generator service and performs additional, or different, testing. For example, the integrate request could identify that the changes stem from automated updates using the change generator service. The deployment pipeline could use this information to select and perform tests intended to verify the automated updates. This allows a reviewer, a submitter, or any other suitable entity to define tests specifically for testing automated updates from the change generator service.

In an embodiment, the deployment pipeline can also run tests prior to enacting the changes in the test environment. For example, the deployment pipeline could analyze the integrate request prior to deploying the changes in a test environment. The deployment pipeline could identify likely errors (e.g., syntax errors) before deploying the changes, at all.

At block 508, the deployment pipeline determines whether the tests are successful, If so, the flow proceeds to block 510 and the deployment pipeline returns a success indication. If not, the flow proceeds to block 512 and the deployment pipeline returns a failure indication.

Figure 6A:
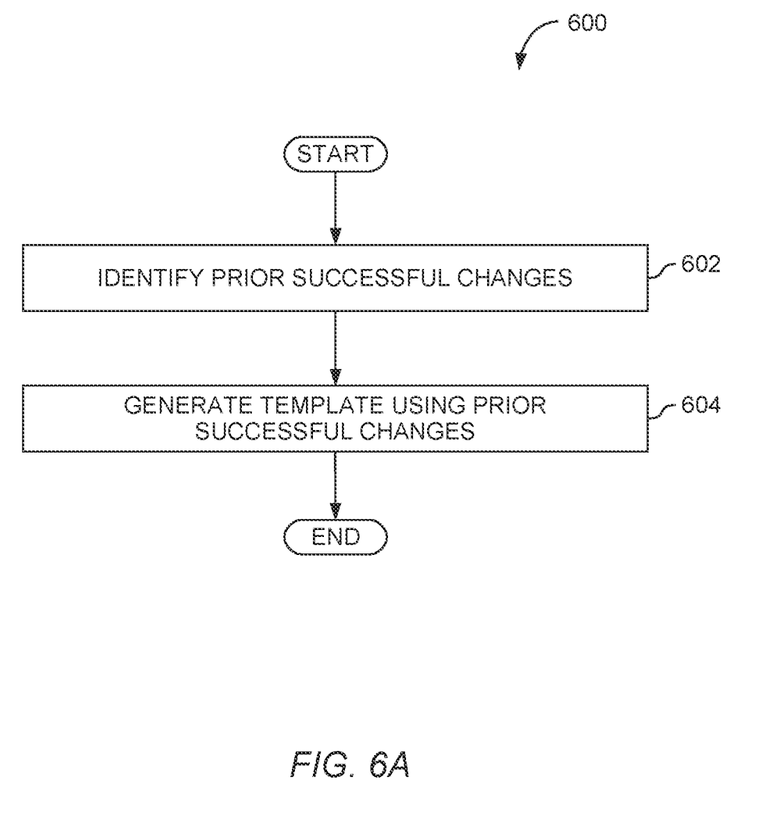
FIG. 6A illustrates a flowchart for generating a change template for automated updates to code deployment pipelines, according to one embodiment.
Figure 6B:
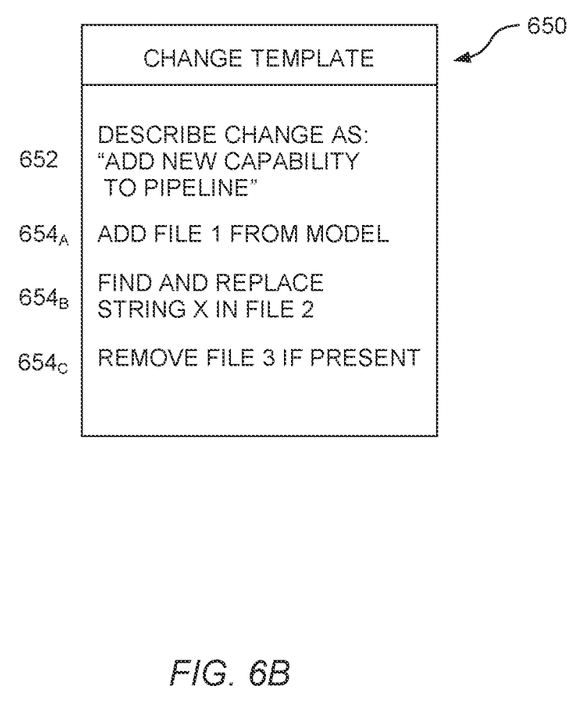
FIG. 6B illustrates a change template for automated updates to code deployment pipelines, according to one embodiment.

FIG. 6A illustrates a flowchart 600 for generating a change template for automated updates to code deployment pipelines, according to one embodiment. In an embodiment, FIG. 6A can be used to generate a change template provided at block 302 illustrated in FIG. 3. At block 602, a change template generation service identifies prior successful changes. In an embodiment, the change template generation service is an aspect of the change generator service 112 illustrated in FIGS. 1-2. This is merely an example, and the change template generation service can be any suitable software service.

In an embodiment, the change template generation service queries a target source code repository for prior changes. For example, a target source code repository may have previously been changed to implement an update (e.g., a dependency on an updated library, an updated API, or any other suitable update). The change template generation service can retrieve a list of changes made to files in the target source code repository for that update (e.g., a diff of files made in the change). Further, in an embodiment, the change template generation service can limit the list of changes to a desired subset of files. For example, the change template generation service can exclude configuration files, test files, etc.

At block 604, the change template generation service generates a template using the prior successful changes. For example, the change template generation service can use the list of changes associated with the prior successful change to generate the template. The change template generation service can add actions to the change template corresponding with each change (e.g., reflecting addition of files, replacement of files, replacement of strings in files).

FIG. 6B illustrates a change template 650 for automated updates to code deployment pipelines, according to one embodiment. In an embodiment, the change template includes a description 652. The description provides a textual description of the changes. This can be used, for example, by a reviewer to discern the purpose of the changes.

In an embodiment, the change template 650 further includes one or more actions $654_A$-$654_C$. As described above in relation to block 402 illustrated in FIG. 4, the change template can include any suitable actions. For example, the change template can include actions requesting to add a file, replace a file, remove a file, add a new file (e.g., with a defined set of instructions), change a string in a file, replace statements (e.g., source statements) in module declarations (e.g., for infrastructure as code declarations), run a local command (e.g., to retrieve, modify, and re-submit files), or perform any other suitable action. These are merely examples, and the change template can include any suitable actions.

As illustrated in FIG. 6B, the change template 650 includes actions $654_A$, $654_B$, and $654_C$. The action $654_A$ adds a file from a model (e.g., from model repository 120 illustrated in FIG. 1). The action $654_B$ finds and replaces a string "X" in a particular file, File 2. The action $654_C$ removes file File 3, if that file is present. As discussed, these are merely examples, and the change template can include any suitable actions.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a proposed change to a plurality of source code repositories by parsing a change template generated automatically based on previously committed changes;
   determining one or more changes to one or more files in each respective source code repository, of the plurality of source code repositories, based on the proposed change;
   changing the one or more files in each respective source code repository, based on the determined one or more changes; and
   building a project in each respective source code repository using the changed one or more files.

2. The method of claim 1, wherein determining the one or more changes to the one or more files in each respective source code repository comprises:
   generating an integrate request for each respective source code repository, the integrate request relating to the proposed change.

3. The method of claim 2, further comprising:
   generating a branch in each respective source code repository; and
   committing the integrate request for each respective source code repository in the respective branch.

4. The method of claim 2, further comprising:
   committing the integrate request for each respective source code repository; and
   performing one or more tests for each respective source code repository, based on the committed integrate request.

5. The method of claim 4, further comprising:
   determining that at least one of the one or more tests does not succeed, and in response, generating a notification to modify the change template.

6. The method of claim 1, wherein identifying the proposed change comprises:
   parsing the change template to identify a change action for the proposed change.

7. The method of claim 6, wherein the change action relates to an additional file outside of the source code repository for the proposed change, and the method further comprises:
   identifying an additional repository for the additional file, based on parsing the change template; and
   retrieving the additional file from the additional repository.

8. The method of claim 1, further comprising:
   generating the change template based on prior changes to one or more source code repositories.

9. The method of claim 8, wherein generating the change template based on prior changes to one or more source code repositories further comprises:
   comparing contents of a file in the one or more source code repositories before the prior changes with contents of the file after the prior changes.

10. The method of claim 1, wherein the proposed change to the plurality of source code repositories comprises at least one of: (i) adding an existing file to the respective source code repository, (ii) replacing a file in the respective source code repository, (iii) removing a file from the respective source code repository, (iv) creating a new file in the respective source code repository, or (v) modifying contents of a file in the respective source code repository.

11. A non-transitory computer-readable medium containing computer program code that, when executed by operation of one or more computer processors, performs operations comprising:
identifying a proposed change to a plurality of source code repositories by parsing a change template generated automatically based on previously committed changes;
determining one or more changes to one or more files in each respective source code repository, of the plurality of source code repositories, based on the proposed change;
changing the one or more files in each respective source code repository, based on the determined one or more changes; and
building a project in each respective source code repository using the changed one or more files.

12. The non-transitory computer-readable medium of claim 11, wherein determining the one or more changes to the one or more files in each respective source code repository comprises:
generating an integrate request for each respective source code repository, the integrate request relating to the proposed change.

13. The non-transitory computer-readable medium of claim 12, the operations further comprising:
committing the integrate request for each respective source code repository; and
performing one or more tests for each respective source code repository, based on the committed integrate request.

14. The non-transitory computer-readable medium of claim 13, the operations further comprising: determining that at least one of the one or more tests does not succeed, and in response, generating a notification to modify the change template.

15. The non-transitory computer-readable medium of claim 11, wherein identifying the proposed change comprises:
parsing the change template to identify a change action for the proposed change.

16. The non-transitory computer-readable medium of claim 15, wherein the change action relates to an additional file outside of the source code repository for the proposed change, and the operations further comprise:
identifying an additional repository for the additional file, based on parsing the change template; and
retrieving the additional file from the additional repository.

17. A system, comprising:
a computer processor; and
a memory having instructions stored thereon which, when executed on the computer processor, performs operations comprising:
identifying a proposed change to a plurality of source code repositories by parsing a change template generated automatically based on previously committed changes;
determining one or more changes to one or more files in each respective source code repository, of the plurality of source code repositories, based on the proposed change;
changing the one or more files in each respective source code repository, based on the determined one or more changes; and
building a project in each respective source code repository using the changed one or more files.

18. The system of claim 17, wherein determining the one or more changes to the one or more files in each respective source code repository comprises:
generating an integrate request for each respective source code repository, the integrate request relating to the proposed change.

19. The system of claim 18, the operations further comprising:
committing the integrate request for each respective source code repository; and
performing one or more tests for each respective source code repository, based on the committed integrate request.

20. The system of claim 17, wherein identifying the proposed change comprises:
parsing the change template to identify a change action for the proposed change.

* * * * *